US012235840B2

(12) United States Patent
Doshi et al.

(10) Patent No.: US 12,235,840 B2
(45) Date of Patent: Feb. 25, 2025

(54) DATABASE QUERY OPTIMIZATION VIA PARAMETER-SENSITIVE PLAN SELECTION

(71) Applicant: Google LLC, Mountain View, CA (US)

(72) Inventors: Lyric Pankaj Doshi, San Mateo, CA (US); Eugene Brevdo, Mountain View, CA (US); Campbell Bryce Fraser, Redmond, WA (US)

(73) Assignee: Google LLC, Mountain View, CA (US)

( * ) Notice: Subject to any disclaimer, the term of this patent is extended or adjusted under 35 U.S.C. 154(b) by 73 days.

(21) Appl. No.: 18/055,502

(22) Filed: Nov. 15, 2022

(65) Prior Publication Data

US 2023/0153303 A1 May 18, 2023

Related U.S. Application Data

(60) Provisional application No. 63/264,172, filed on Nov. 16, 2021.

(51) Int. Cl.
*G06F 16/2453* (2019.01)
*G06F 11/34* (2006.01)

(52) U.S. Cl.
CPC .... *G06F 16/24542* (2019.01); *G06F 11/3419* (2013.01)

(58) Field of Classification Search
None
See application file for complete search history.

(56) References Cited

U.S. PATENT DOCUMENTS 5,995,959 A * 11/1999 Friedman ............ G06F 16/2471
707/999.005
2006/0074970 A1* 4/2006 Narayanan .......... G06F 11/3476
707/999.102
(Continued)

FOREIGN PATENT DOCUMENTS

WO WO-2012041388 A1 * 4/2012 ....... G06F 17/30457

OTHER PUBLICATIONS

Singh R, Sharma S, Singh S, Singh B. Reducing Run-time Execution in Query Optimization. International Journal of Computer Applications. Jan. 1, 2014;96(6). (Year: 2014).*
(Continued)

*Primary Examiner* — Uyen T Le
(74) *Attorney, Agent, or Firm* — Honigman LLP; Brett A. Krueger

(57) ABSTRACT

A method includes receiving a database query requesting a database to conditionally return one or more data blocks. The database is stored on memory hardware in communication with the data processing hardware and the database query includes a plurality of parameters characterizing the database query. The method includes generating a set of query plans. Each query plan in the set of query plans is configured to execute the database query using a different order of operations. The method includes training a model using historical database queries and generating, using the trained model, a query plan score for each query plan in the set of query plans. The method includes selecting, using the query plan score of each query plan in the set of query plans, a query plan from the set of query plans. The method also includes executing the database query using the selected query plan.

18 Claims, 5 Drawing Sheets

(56) References Cited

U.S. PATENT DOCUMENTS

| | | | | |
|---|---|---|---|---|
| 2008/0195578 | A1 | 8/2008 | Hueske et al. | |
| 2008/0222093 | A1 | 9/2008 | Fan et al. | |
| 2009/0100004 | A1* | 4/2009 | Andrei | G06F 16/2453 |
| 2011/0032076 | A1* | 2/2011 | Rickman | G06V 40/70 340/5.82 |
| 2018/0285417 | A1* | 10/2018 | Lazovic | G06F 16/24542 |
| 2020/0183936 | A1* | 6/2020 | Ramesh | G06F 16/24545 |
| 2020/0349161 | A1* | 11/2020 | Siddiqui | G06F 16/211 |
| 2022/0067046 | A1* | 3/2022 | Katroulis | G06F 11/3419 |
| 2022/0188308 | A1* | 6/2022 | Sun | G06N 20/00 |
| 2022/0414099 | A1* | 12/2022 | Dutt | G06F 11/3409 |

OTHER PUBLICATIONS

Kunjir M, Birwa PK, Haritsa JR. Peak power plays in database engines. InProceedings of the 15th International Conference on Extending Database Technology Mar. 27, 2012 (pp. 444-455). (Year: 2012).*

Li, Guoliang, Xuanhe Zhou, and Sihao Li. "Xuanyuan: An ai-native database." IEEE Data Eng. Bull. 42.2 (2019): 70-81. (Year: 2019).*

Plan-Structured Deep Neural Network Models for Query Performance Prediction. chrome-extension://efaidnbmnn-nibpcajpcglclefindmkaj/https://www.vidb.org/pvldb/vol12/p1733-marcus.pdf Ryan Marcus and Olga Papaemmanouil, Jan. 31, 2019, 14 pages.

Akdere et al., Learning-based Query Performance Modeling and Prediction, chrome-extension://efaidnbmnnnibpcajpcglclefindmkaj/ http://128.148.32.110/people/makdere/papers/qperf-tr.pdf, published Jul. 2, 2012, 12 pages.

International Search Report and Written Opinion for the related Application No. PCT/US2022/079859, dated Feb. 17, 2023, 65 pages.

He Henry: "Storage: How 'tail latency' impacts customer-facing applications", Aug. 13, 2019 (Aug. 13, 2019), XP093021814, Retrieved from the Internet: URL:https://www.computerweekly.com/opinion/Storage-How-tail-latency-impacts-customer-faci ng-applications [retrieved on Feb. 7, 2023], 6 pages.

Gmarmstrong: "Query optimization", Sep. 27, 2021 (Sep. 27, 2021), XP093021823, Retrieved from the Internet: URL:https://en.wikipedia.org/w/index.php?title=Query_optimization&oldid 1046825627 [retrieved on Feb. 7, 2023], 5 pages.

* cited by examiner

DATABASE QUERY OPTIMIZATION VIA PARAMETER-SENSITIVE PLAN SELECTION

CROSS REFERENCE TO RELATED APPLICATIONS

This U.S. patent application claims priority under 35 U.S.C. § 119(e) to U.S. Provisional Application 63/264,172, filed on Nov. 16, 2021. The disclosure of this prior application is considered part of the disclosure of this application and is hereby incorporated by reference in its entirety.

TECHNICAL FIELD

This disclosure relates to optimizing database queries via parameter-sensitive plan selection.

BACKGROUND

Cloud database systems are increasingly used to store and query vast quantities of data. Conventional database query engines, when receiving a query from a user, build query plans to execute the received query. The query plan describes how a query is converted into a "program" that returns the requested data. The selection of the query plan determines the runtime (i.e., the latency) that the query incurs. Query latency is the primary user-visible performance metric for databases and users.

SUMMARY

One aspect of the disclosure provides a computer-implemented method for database query optimization that when executed by data processing hardware causes the data processing hardware to perform operations. The operations include receiving a database query requesting a database to conditionally return one or more data blocks stored at the database. The database is stored on memory hardware in communication with the data processing hardware and the database query includes a plurality of respective parameters characterizing the database query. The operations include generating a set of query plans. Each query plan in the set of query plans is configured to execute the database query using a different order of operations. The operations include training a model using historical database queries and generating, using the trained model, a query plan score for each query plan in the set of query plans based on the plurality of respective parameters. The operations include selecting, using the query plan score of each query plan in the set of query plans, a query plan from the set of query plans. The operations also include executing the database query using the selected query plan.

Implementations of the disclosure may include one or more of the following optional features. In some implementations, the database query includes a Structured Query Language (SQL) query. Optionally, generating the set of query plans includes using a database query planner. In some examples, selecting the query plan is based on an amount of memory available or an amount of cache available. Selecting the query plan may be based on a predicted latency of each query plan of the set of query plans. The predicted latency may include a tail latency.

In some implementations, selecting the query plan is based on a predicted resource usage of each query plan of the set of query plans. Each query plan of the set of query plans may include a hint string and selecting the query plan may be based on the hint string of each query plan of the set of query plans. In some examples, the operations further include, prior to generating the set of query plans, selecting a query template from a set of query templates. Generating the set of query plans includes using the selected query template. Selecting the query plan may be based on a state of the data processing hardware.

Another aspect of the disclosure provides a system for database query optimization. The system includes data processing hardware and memory hardware in communication with the data processing hardware. The memory hardware stores instructions that when executed on the data processing hardware cause the data processing hardware to perform operations. The operations include receiving a database query requesting a database to conditionally return one or more data blocks stored at the database. The database is stored on memory hardware in communication with the data processing hardware and the database query includes a plurality of respective parameters characterizing the database query. The operations include generating a set of query plans. Each query plan in the set of query plans is configured to execute the database query using a different order of operations. The operations include training a model using historical database queries and generating, using the trained model, a query plan score for each query plan in the set of query plans based on the plurality of respective parameters. The operations include selecting, using the query plan score of each query plan in the set of query plans, a query plan from the set of query plans. The operations also include executing the database query using the selected query plan.

This aspect may include one or more of the following optional features. In some implementations, the database query includes a Structured Query Language (SQL) query. Optionally, generating the set of query plans includes using a database query planner. In some examples, selecting the query plan is based on an amount of memory available or an amount of cache available. Selecting the query plan may be based on a predicted latency of each query plan of the set of query plans. The predicted latency may include a tail latency.

In some implementations, selecting the query plan is based on a predicted resource usage of each query plan of the set of query plans. Each query plan of the set of query plans may include a hint string and selecting the query plan may be based on the hint string of each query plan of the set of query plans. In some examples, the operations further include, prior to generating the set of query plans, selecting a query template from a set of query templates. Generating the set of query plans includes using the selected query template. Selecting the query plan may be based on a state of the data processing hardware.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Cloud database systems are increasingly used to store and query vast quantities of data. Conventional database query engines, when receiving a query from a user, build query plans to execute the received query. The query plan describes how a query is converted into a "program" that returns the requested data. The selection of the query plan determines the runtime (i.e., the latency) that the query incurs. Query latency is the primary user-visible performance metric for databases and users. However, conventional query planners, while strong in many scenarios, may fail at identifying and/or selecting the optimal query plan, especially for complex queries. These failures can be quite expensive computationally or temporally. Modern query planners rely on decades of research and expertise to choose or select the optimal query plan from the set of plans generated to execute a given query. Nonetheless, conventional techniques still may fail to select the most optimal (e.g., relative to latency, resource usage, etc.) query plan from the set, even when the query planner is successful at generating quality query plans.

Users often repeatedly execute similar queries that only change one or more predicates. For example, a query "SELECT foo from bar WHERE foo>@param0" is a query where an application or user may perform the query multiple times with different values of "@param0" across different instances or executions. The optimal (i.e., fastest) query plan to execute the query may vary based on the bound predicate or parameter values, which in turn affect selectivities, join order decisions, join algorithms, and more. Determining the optimal query plan given the bound parameter values requires overcoming compounding cardinality estimation and cost-estimation errors. Moreover, changes to conventional query planners and optimizers introduce concerns regarding plan stability. Even when a new version of a planner is generally an improvement, certain queries that users rely on may actually regress (e.g., in latency).

Implementations herein are directed toward a query optimizer that leverages conventional query planners and machine learning to identify and select an optimal query plan from a set of query plans to execute a database query. The query optimizer generates plans for a given query template and uses machine learning (e.g., neural networks) to build a function that, for example, ranks the plans given query parameters. Alternatively, the query optimizer learns a latency estimate given the query parameters and selects the plan with the lowest latency. The query optimizer then executes the selected query plan to retrieve the requested data.

Figure 1:
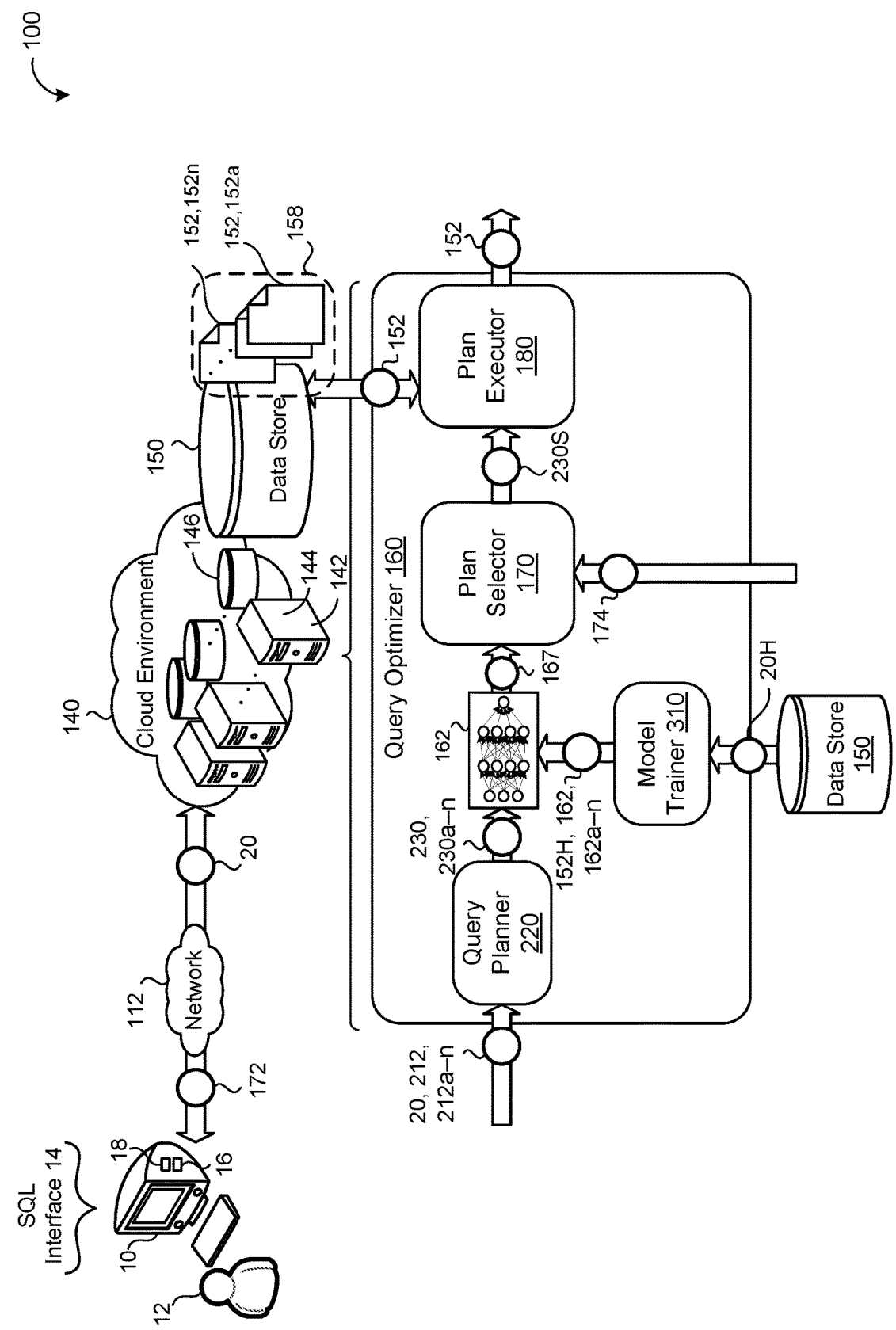
FIG. 1 is a schematic view of an example system for optimizing database queries.

Referring to FIG. 1, in some implementations, a database query optimizer system 100 includes a remote system 140 in communication with one or more user devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to store a plurality of data blocks 152, 152a-n within one or more databases 158, 158a-n (i.e., a cloud database). The data store 150 may store any number of databases 158 at any point in time.

The remote system 140 is configured to receive a database query 20 (i.e., a request) from a user device 10 associated with a respective user 12 via, for example, the network 112. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). The user 12 may construct the database query 20 using a Structured Query Language (SQL) interface 14, although other interfaces are contemplated. The database query 20 requests the remote system 140 to query one or more of the databases 158 to conditionally return one or more data blocks 152 stored at the queried databases 158. As discussed in more detail below, the database query 20 includes (explicitly or implicitly) one or more parameters 214, 214a-n that characterize the database query 20.

The remote system 140 executes a query optimizer 160 that receives the database query 20. The query optimizer 160 may include a query planner 220 that, using the database query 20, generates a set of query plans 230, 230a-n. Each query plan 230 in the set of query plans 230 are configured to execute the database query using a different order of operations. That is, each query plan 230 is a different "program" that provides specific instructions and ordering for operations (e.g., join operations, scan operations, merge operations, etc.) the query optimizer 160 may perform or execute to retrieve the data blocks 152 requested by the database query 20. Each database query 20 may be executed in any number of ways (i.e., with any number and order of different operations). The set of query plans 230 represents at least a portion of the different ways the query optimizer 160 may perform operations to retrieve the requested data blocks 152.

In some implementations, the query optimizer 160 includes a model trainer 310. The model trainer 310 trains a model 162 using, for example, historical database queries 20H (i.e., database queries 20 previously executed by the query optimizer 160 or other processing systems). The trained model 162 receives the set of query plans 230 and generates a query plan score 167 or otherwise ranks each query plan 230. The trained model 162 generates or predicts the query plan scores 167 based on the training using the historical database queries 20H and/or other features, such as the parameters 214. For example, the trained model 162 generates the query plan score 167 based on a predicted amount of latency the corresponding query plan 230 will incur during execution. In other examples, the trained model 162 generates the query plan score 167 based on an amount of resources (e.g., processing resources, memory resources, bandwidth resources, etc.) required to execute the corresponding query plan 230. The query plan score 167 may be based on a number of different factors (e.g., a combination of latency and required resources). The trained model 162 may generate multiple query plan scores 167 for each query plan 230 to correspond to different predicted aspects of the query plan 230 (i.e., a first score for latency and a second score for resources consumed).

A plan selector 170 receives the query plan scores 167 for the set of query plans 230 and selects a query plan 230S from the set of query plans 230 based on or using the query plan scores 167. In some implementations, the plan selector 170 selects the query plan 230S based on one or more configurable user preferences 174. For example, the user 12 specifies (e.g., via the database query 20) that latency is the most important factor when executing the database query 20, and thus the plan selector 170 selects the query plan 230 with the query plan score 167 that reflects the lowest predicted latency. A plan executor 180 may execute the selected query plan 230S and return one or more data blocks 152 to the user device 10 based on the results of execution of the selected query plan 230S.

Figure 2:
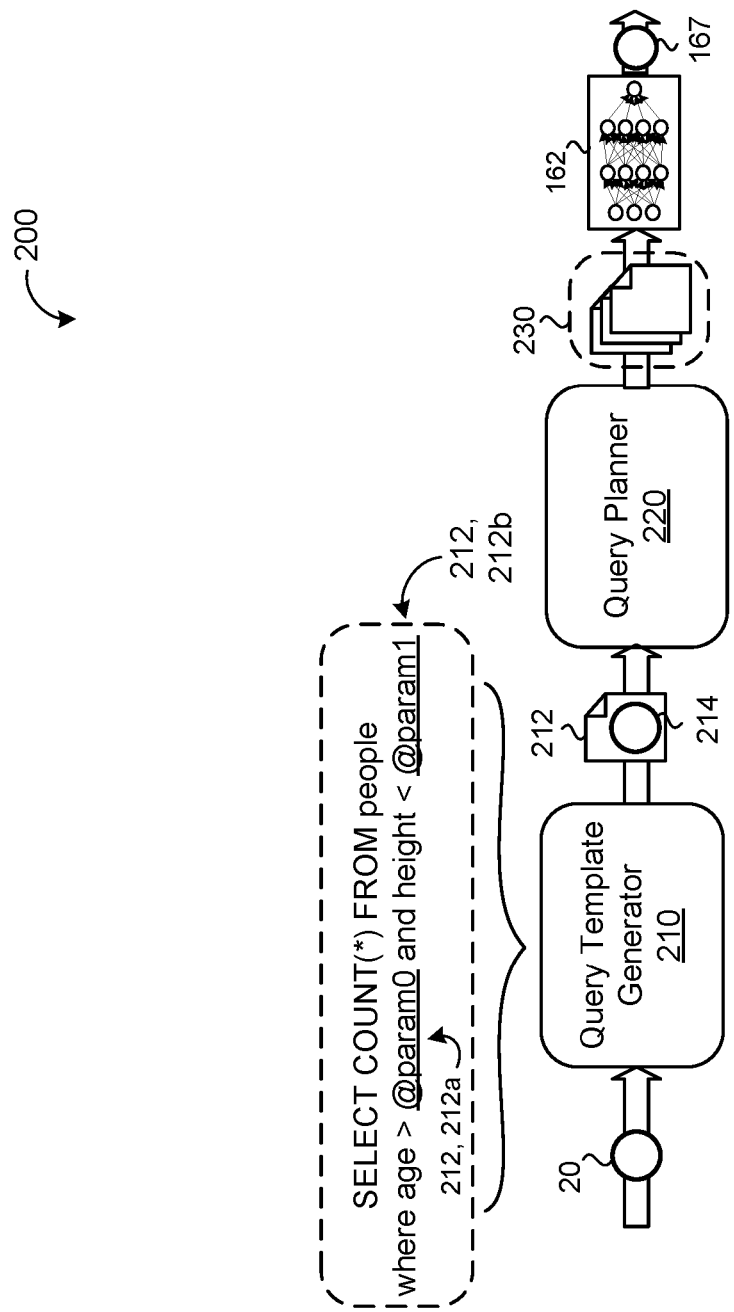
FIG. 2 is a schematic view of exemplary components of a query optimizer of the system of FIG. 1.

Referring now to FIG. 2, a schematic view 200 includes exemplary components of the query optimizer 160. Here, a query template generator 210 receives the database query 20 and generates or populates or otherwise provides a template 212 to the query planner 220. The template 212 includes the parameters 214 received or derived from the database query 20. In some examples, the parameters 214 are directly extracted from the database query 20. In other examples, the database query 20 is not parameterized, but instead includes predicates that the query optimizer 160 converts into one or more parameters 214. For example, the query optimizer (e.g., the query template generator 210) may convert a database query 20 that includes the query "r.r_name='Europe'" into "r.r_name=@param0", where '@param0' represents a parameter 212. As another example, the query optimizer 160 may convert the query "c.c_mktsegment='BUILDING'" into "c.c_mktsegment=@param1" where '@param1' represent another parameter 214.

In some implementations, the query template generator 210 receives the database query 20 and populates an existing template 212 with parameters extracted from the database query 20 or generates a new template 212 (e.g., when no existing template 212 is appropriate for the database query 20). The query planner 220 then generates the set of query plans 230 using the template 212 populated with the parameters 214 (i.e., an instance of the template 212). The query planner 220 may be a conventional query planner used in typical database systems that leverages previous experience in generating quality query plans 230. The query planner 220 may be configured to generate any number of query plans 230.

Additionally or alternatively, the query optimizer 160 uses other means to generate the set of query plans 230. For example, the query optimizer 160 randomly generates the set of query plans 230 from the set of all possible query plans 230. In other examples, the query optimizer 160 generates the entire possible set of query plans 230 (e.g., when the database query 20 is sufficiently simple to produce a manageable number of possible query plans 230). In yet other examples, a machine learning model may be trained to produce the query plans 230.

Regardless how the query plans 230 are generated, the trained model 162 receives each generated query plan 230 and may, for each respective query plan 230, generate a respective query plan score 167. In these examples, the query plan score 167 predicts one or more aspects of the respective query plan 230, such as a predicted latency to execute the query plan 230, predicted resource consumption, etc. Latency may refer to one or more different aspects of the time required to execute the query plan 230. For example, the latency may refer to the mean latency (i.e., the average latency) and/or a tail latency (i.e., a high-percentile latency). In some use cases, one type of latency may be more important than a different type of latency. For example, some users may tolerate a higher mean latency in order to improve a tail latency. The model 162 may be trained based on the desired latency performance. In other examples, the trained model 162 ranks the query plans 230 using the query parameters 214.

Portions or all of the query template generator 210 may be implemented on a system remote to the remote system 140. For example, an external system may parameterize queries and/or programmatically issue queries with a common template to the remote system 140. The query planner 220 may recognize or identity a known template received from the query template generator 210 and fetch a model 162 accordingly (i.e., fetch the model 162 that corresponds to the identified template).

Referring back to FIG. 1, the plan selector 170 receives the query plan scores 167 from the trained model 162 and selects an optimal query plan 230 from the set of query plans 230 based on the provided query plan scores 167. The plan selector 170, for example, selects the query plan 230 that the trained model 162 predicts will have the lowest latency (e.g., median latency, tail latency, etc.). In some examples, the plan selector 170 selects the query plan 230 based at least in part on current available resources of the remote system 140. For example, the plan selector 170 determines an amount of available memory and/or cache and bases the query plan selection on the determined amounts. Specifically, the plan selector 170 may weight a query plan 230 that is predicted to consume less resources higher than query plans 230 that consume more resources. On the other hand, when the amount of resources available is high, the plan selector 170 may apply little weight to the predicted amount of resources consumed when selecting the optimal query plan 230. In some implementations, the query optimizer 160 trains a separate model 162 for each template 212. In these implementations, each model 162 is trained on historical database queries 20H that apply to the respective template 212 of the model 162. Alternatively, the query optimizer 160 trains a general model 162 that is applicable to multiple templates 212.

Additionally or alternatively, the user 12 provides one or more user preferences 174. The user preferences 174 may influence the query plan 230 the plan selector 170 selects by providing weight to preferences such as importance of types of latencies (median, tail, etc.), resource limits, etc.

Figure 3:
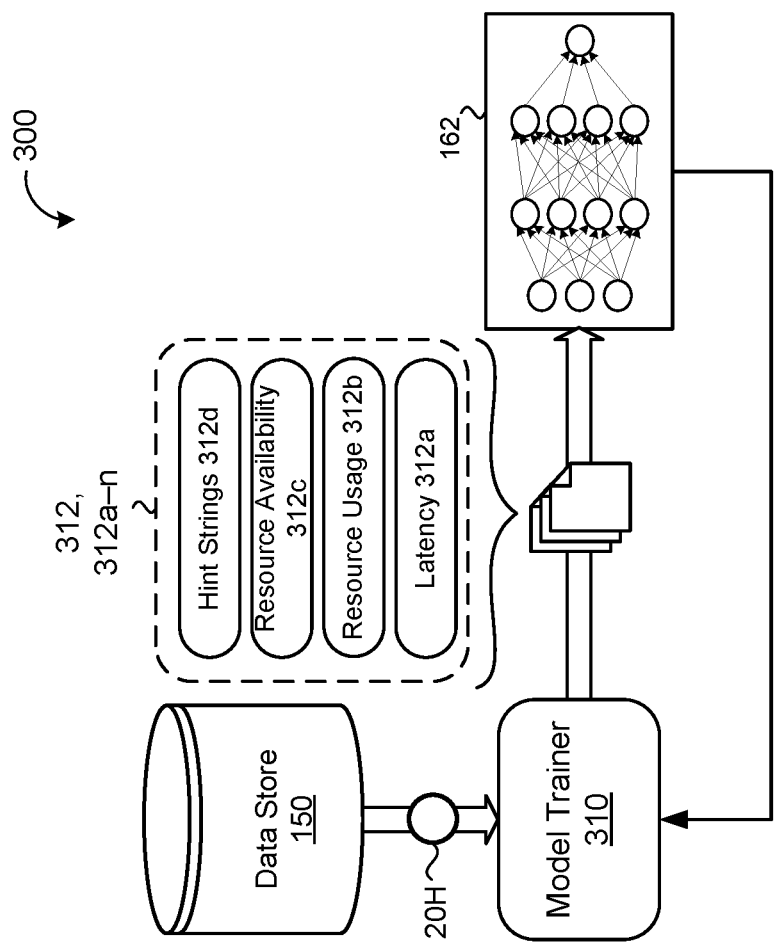
FIG. 3 is a schematic view of exemplary components of a query planner of the query optimizer of FIG. 2.

Referring now to FIG. 3, a schematic view 300 includes the model trainer 310 and the model 162. Here, the model trainer 310, when training the model 162, retrieves training samples from the data store 150. The training samples include, for example, annotated historical database queries 20H and the query plan used to execute the respective historical database query 20H. The annotated historical database queries 20H may include the query, the query plan used, the actual latency of the query plan used, the amount of resources used, etc. The training samples may be formed of one or more templates 212 generated by the query template generator 210 (FIG. 2). The training samples may include any number of features 312, 312a-n. Exemplary features of the training samples include, but are not limited to, the actual latency 312a of the corresponding historical database query 20H, the actual resource usage 312b, the resource availability 312c when the query plan was executed, and one or more hint strings 312d. Hint strings 312d refer to configuration parameters provided to query planners to guide or control query plan creation and selection. For example, a hint string 312d may be a simple description of special form integrated into the SQL query text. Thus, in some implementations, each query plan 230 includes a hint string 312d and the plan selector 170 selects the query plan 230S based at least in part on the hint strings 312d (e.g., via the hint strings 312d influencing the query plan score 167 or based on the selection by the plan selector 170). During training, the model 162 provides predictions (i.e., generates the query plan scores 167) and adjusts weights or other parameters based on the training samples.

The query optimizer 160 may generate the query plans 230 and train the model(s) 162 "offline." That is, the query optimizer 160 may train a large number of models 162, each model 162 trained on database queries 20 fit to a specific template 212. For example, a first model 162 is trained on many database queries 20 that each "fit" a first template 212. The first model 162, once trained, will be selected (e.g., by the query planner 220) when a database query 20 from a user 12 that fits the corresponding template 212. A second model 162 may be trained on database queries 20 that fit a different template 212. This second model, once trained, will be selected when a database query 20 from a user 12 fits the template 212 that corresponds to the second model 162.

Thus, the query optimizer 160 employs machine learning techniques and empirical query execution latencies (i.e., actual latencies 310a measured from historical database queries 20H) to overcome shortcomings in conventional query optimizer cost models and cardinality estimates. The query optimizer 160 may leverage decades of database expertise by using a conventional database query planner 220 to generate the query plans 230 while refining the query plan selection using observed, actual behavior. The query optimizer 160 improves plan stability as the model 162 adjusts to capture improvements in query planners 220 while avoiding optimizer regressions.

Figure 4:
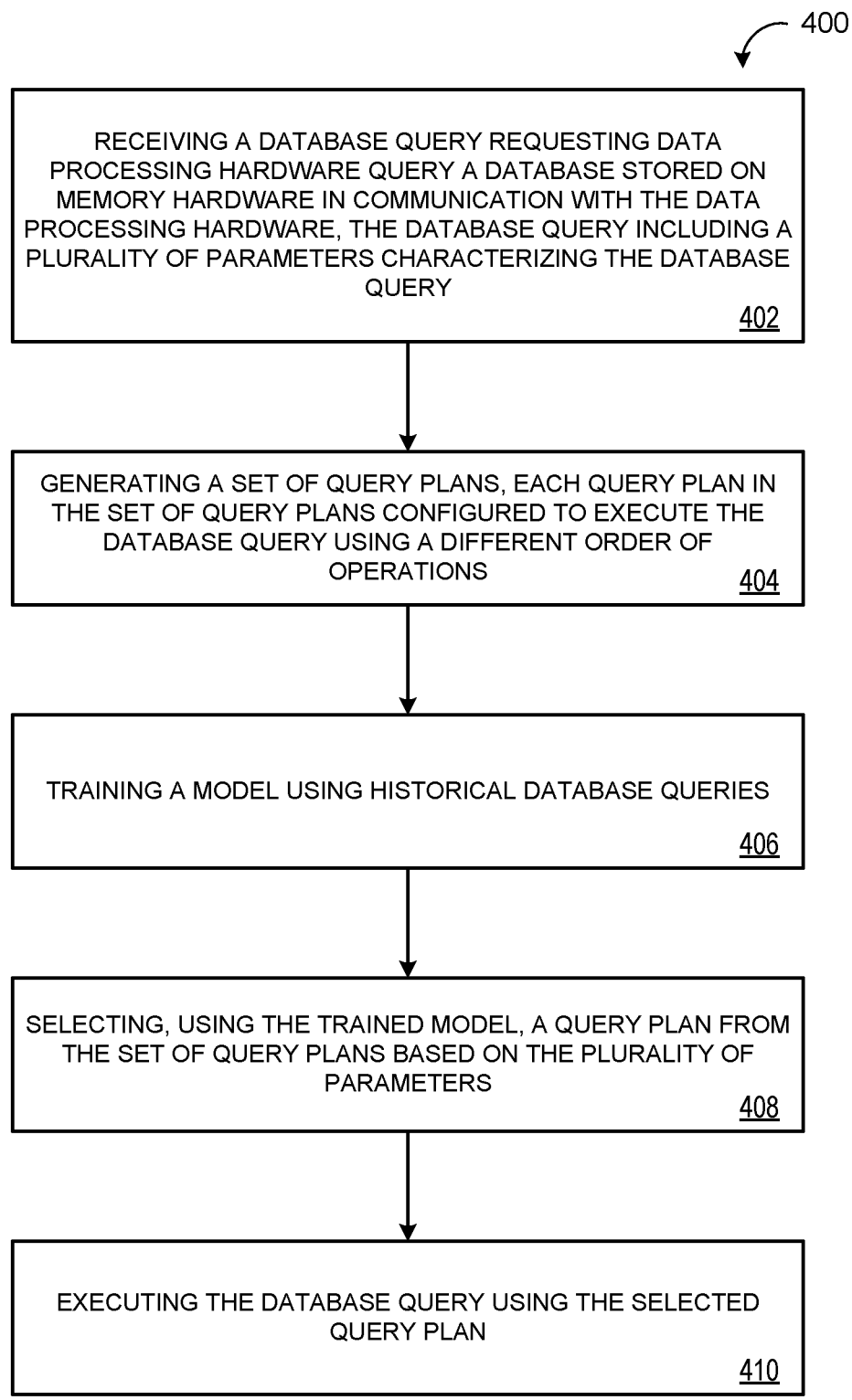
FIG. 4 is a flowchart of an example arrangement of operations for a method of optimizing a database query using parameter-sensitive plan selection.

FIG. 4 is a flowchart of an exemplary arrangement of operations for a method 400 that, when executed by data processing hardware 144, causes the data processing hardware to perform operations to optimize a database query via parameter-sensitive plan selection. The method 400, at operation 402, includes receiving a database query 20 requesting the data processing hardware 144 query a database 158 stored on memory hardware 146 in communication with the data processing hardware 144. The database query 20 includes a plurality of parameters 214 characterizing the database query 20. At operations 404, the method 400 includes generating a set of query plans 230. Each query plan 230 in the set of query plans 230 is configured to execute the database query 20 using a different order of operations. The method 400, at operation 406, includes training a model 162 using historical database queries 20H. At operation 408, the method 400 includes generating, using the trained model 162, a query plan score 167 for each query plan 230 in the set of query plans 230. At operation 410, the method 400 includes selecting, using the query plan score 167 of each query plan 230 in the set of query plans 230, a query plan 230S from the set of query plans 230. At operation 412, the method 400 includes executing the database query 20 using the selected query plan 230.

Figure 5:
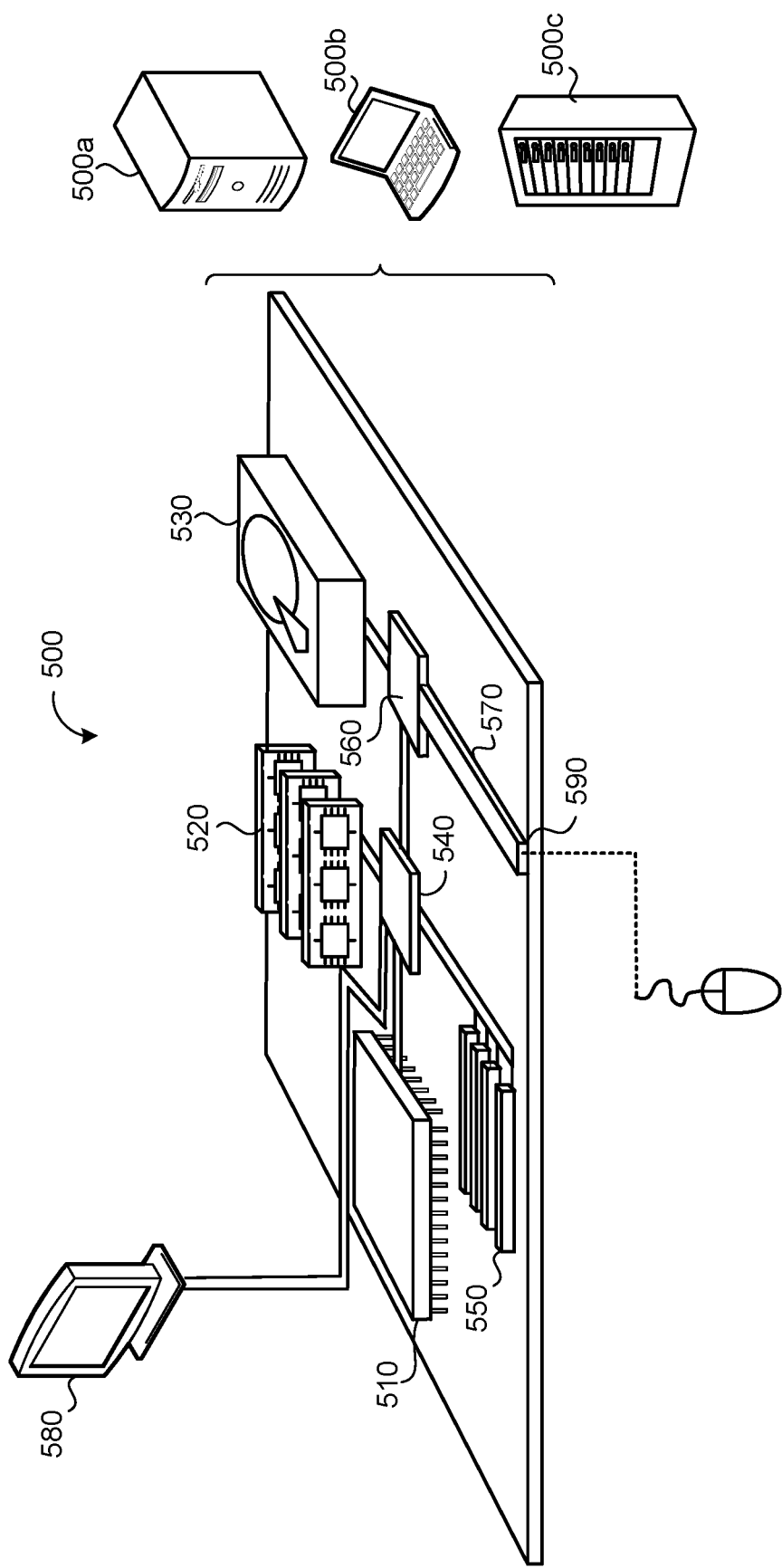
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   receiving a database query requesting a database to conditionally return one or more data blocks stored at the database, the database stored on memory hardware in communication with the data processing hardware and the database query comprising a plurality of respective parameters characterizing the database query;
   selecting, based on the received database query, a query template from a set of query templates, the selected query template comprising a plurality of operations for performing the database query;
   generating, based on the selected query template, a set of query plans, each query plan in the set of query plans configured to execute the database query using the plurality of operations of the selected query template in a corresponding different order;
   training a model using historical database queries;
   generating, using the trained model, a query plan score for each query plan in the set of query plans based on the plurality of respective parameters;
   selecting, using the query plan score generated for each query plan in the set of query plans, a query plan from the set of query plans; and
   executing the database query using the selected query plan.

2. The method of claim 1, wherein the database query comprises a Structured Query Language (SQL) query.

3. The method of claim 1, wherein generating the set of query plans comprises generating the set of query plans using a database query planner.

4. The method of claim 1, wherein selecting the query plan is based on an amount of memory available or an amount of cache available.

5. The method of claim 1, wherein selecting the query plan is based on a predicted latency of each query plan of the set of query plans.

6. The method of claim 5, wherein the predicted latency comprises a tail latency.

7. The method of claim 1, wherein selecting the query plan is based on a predicted resource usage of each query plan of the set of query plans.

8. The method of claim 1, wherein:
each query plan of the set of query plans comprises a hint string; and
selecting the query plan is based on the hint string of each query plan of the set of query plans.

9. The method of claim 1, wherein selecting the query plan is based on a state of the data processing hardware.

10. A system comprising:
data processing hardware; and
memory hardware in communication with the data processing hardware, the memory hardware storing instructions that, when executed on the data processing hardware, cause the data processing hardware to perform operations comprising:
receiving a database query requesting a database to conditionally return one or more data blocks stored at the database, the database stored on memory hardware in communication with the data processing hardware and the database query comprising a plurality of respective parameters characterizing the database query;
selecting, based on the received database query, a query template from a set of query templates, the selected query template comprising a plurality of operations for performing the database query;
generating, based on the selected query template, a set of query plans, each query plan in the set of query plans configured to execute the database query using the plurality of operations of the selected query template in a corresponding different order;
training a model using historical database queries;
generating, using the trained model, a query plan score for each query plan in the set of query plans based on the plurality of respective parameters;
selecting, using the query plan score generated for each query plan in the set of query plans, a query plan from the set of query plans; and
executing the database query using the selected query plan.

11. The system of claim 10, wherein:
each query plan of the set of query plans comprises a hint string; and
selecting the query plan is based on the hint string of each query plan of the set of query plans.

12. The system of claim 10, wherein selecting the query plan is based on a state of the data processing hardware.

13. The system of claim 10, wherein the database query comprises a Structured Query Language (SQL) query.

14. The system of claim 10, wherein generating the set of query plans comprises generating the set of query plans using a database query planner.

15. The system of claim 10, wherein selecting the query plan is based on an amount of memory available or an amount of cache available.

16. The system of claim 10, wherein selecting the query plan is based on a predicted latency of each query plan of the set of query plans.

17. The system of claim 16, wherein the predicted latency comprises a tail latency.

18. The system of claim 10, wherein selecting the query plan is based on a predicted resource usage of each query plan of the set of query plans.

\* \* \* \* \*